US012807229B2

(12) United States Patent
Tokoro et al.

(10) Patent No.: US 12,807,229 B2
(45) Date of Patent: Nov. 24, 2026

(54) CONTROL DEVICE FOR COMBINATION VEHICLE, CONTROL METHOD FOR COMBINATION VEHICLE, AND CONTROL PROGRAM FOR COMBINATION VEHICLE

(71) Applicants: JTEKT CORPORATION, Kariya (JP); J-QuAD DYNAMICS INC., Tokyo (JP)

(72) Inventors: Hirotaka Tokoro, Tokyo (JP); Nobuhiro Nitta, Tokyo (JP)

(73) Assignees: JTEKT CORPORATION, Kariya (JP); J-QUAD DYNAMICS INC., Tokyo (JP)

( * ) Notice: Subject to any disclaimer, the term of this patent is extended or adjusted under 35 U.S.C. 154(b) by 50 days.

(21) Appl. No.: 18/865,445

(22) PCT Filed: May 18, 2023

(86) PCT No.: PCT/JP2023/018563
§ 371 (c)(1),
(2) Date: Nov. 13, 2024

(87) PCT Pub. No.: WO2023/228854
PCT Pub. Date: Nov. 30, 2023

(65) Prior Publication Data

US 2025/0313264 A1 Oct. 9, 2025

(30) Foreign Application Priority Data

May 23, 2022 (JP) ................................ 2022-084039

(51) Int. Cl.
*B62D 13/06* (2006.01)
*B60K 35/22* (2024.01)
(Continued)

(52) U.S. Cl.
CPC .......... *B62D 15/0275* (2013.01); *B60K 35/22* (2024.01); *B60K 35/28* (2024.01);
(Continued)

(58) Field of Classification Search
CPC ................ B62D 13/06; B62D 15/0285; B62D 15/0275; B62D 15/027; B62D 15/028;
(Continued)

(56) References Cited

U.S. PATENT DOCUMENTS 10,112,646 B2 10/2018 Lavoie
2010/0171828 A1* 7/2010 Ishii ...................... H04N 7/183
348/135

(Continued)

FOREIGN PATENT DOCUMENTS

CN 106915304 A 7/2017
JP 2009-060499 A 3/2009

(Continued)

OTHER PUBLICATIONS

Jul. 25, 2025 extended Search Report issued in European Patent Application No. 23811727.9.

(Continued)

*Primary Examiner* — Dionne Pendleton
(74) *Attorney, Agent, or Firm* — Oliff PLC

(57) ABSTRACT

A control device is applied to a combination vehicle including a tractor and a trailer that is towed by the tractor. The control device is configured to perform a state quantity acquisition process, a predicted trajectory information calculation process, and a display process. The state quantity acquisition process is a process of acquiring a state quantity of the combination vehicle. The predicted trajectory information calculation process is a process of calculating predicted trajectory information of the trailer according to the state quantity. The display process is a process of displaying
(Continued)

the predicted trajectory information by operating a display device.

14 Claims, 10 Drawing Sheets

(51) Int. Cl.
*B60K 35/28* (2024.01)
*B60W 50/00* (2006.01)
*B62D 15/02* (2006.01)
*G06T 19/00* (2011.01)

(52) U.S. Cl.
CPC ......... *B60W 50/0097* (2013.01); *B62D 13/06* (2013.01); *G06T 19/006* (2013.01)

(58) Field of Classification Search
CPC .............. B62D 15/029; B62D 15/0295; B62D 15/021; B62D 15/025; B62D 6/002; B62D 12/02; B62D 13/00; B62D 15/0245; B62D 6/003; B62D 9/00; B60W 2520/22; B60W 10/20; B60W 2300/14; B60W 30/00; B60W 30/045; B60W 10/04; B60W 10/18; B60W 2540/18; B60W 30/18036; B60W 30/02; B60W 2050/146; B60W 2520/10; B60W 2720/22; B60W 30/06; B60W 40/12; B60W 50/0097; B60W 50/14; B60W 2050/0088; B60W 2300/145; B60W 2510/20; B60W 2540/215; B60W 2556/40; B60W 2720/10; B60W 50/0098; B60D 1/62; B60D 1/245; B60D 1/06; H04N 7/183; H04N 5/2628; H04N 5/272; H04N 7/18; H04N 9/3129; B60T 2230/08; B60T 13/586; B60T 2230/06; B60T 2250/03; B60T 2250/04; B60T 2260/02; B60T 7/12; B60T 7/122; B60T 7/20; B60T 8/1708; B60T 8/248; G01B 21/22; G06T 11/23; G06T 19/006; B60K 35/22; B60K 35/28; B60Q 1/22; B60Q 9/005; B60R 1/26; B60R 1/30; B60R 21/00; B60R 2300/305; B60R 2300/806; G08G 1/0962; G08G 1/168
See application file for complete search history.

(56) References Cited

U.S. PATENT DOCUMENTS

| | | | | |
|---|---|---|---|---|
| 2014/0358429 | A1 | 12/2014 | Shutko et al. | |
| 2019/0092388 | A1* | 3/2019 | Raad | B62D 13/06 |
| 2021/0206213 | A1* | 7/2021 | Matsushita | B60R 11/04 |
| 2021/0284240 | A1 | 9/2021 | Goodarzi et al. | |

FOREIGN PATENT DOCUMENTS

| | | | |
|---|---|---|---|
| JP | 2021-111814 | A | 8/2021 |
| WO | 2021/127693 | A1 | 6/2021 |

OTHER PUBLICATIONS

Aug. 8, 2023 Search Report issued in International Patent Application No. PCT/JP2023/018563.

* cited by examiner

CONTROL DEVICE FOR COMBINATION VEHICLE, CONTROL METHOD FOR COMBINATION VEHICLE, AND CONTROL PROGRAM FOR COMBINATION VEHICLE

CROSS-REFERENCE TO RELATED APPLICATIONS

This application is national stage application of International Application No. PCT/JP2023/018563, filed on May 18, 2023, which claims the benefit of priority from Japanese Patent Application No. 2022-084039, filed on May 23, 2022, the entire contents of each of which are incorporated herein by reference.

TECHNICAL FIELD

The present disclosure relates to control devices for combination vehicles, control methods for combination vehicles, and control programs for combination vehicles.

BACKGROUND ART

For example, Patent Document 1 below describes a control device that displays the time it takes for a hitch angle to return to zero in a combination vehicle.

RELATED ART DOCUMENTS

Patent Documents

Patent Document 1: U.S. Pat. No. 10,112,646

SUMMARY OF THE INVENTION

Problem to be Solved by the Invention

With the above control device, it is difficult for a driver to always grasp the behavior of a trailer.

Means for Solving the Problem

One aspect of the present disclosure provides a control device for a combination vehicle including a tractor and a trailer that is towed by the tractor. The control device is configured to perform a state quantity acquisition process, a predicted trajectory information calculation process, and a display process. The state quantity acquisition process is a process of acquiring a state quantity of the combination vehicle. The predicted trajectory information calculation process is a process of calculating predicted trajectory information of the trailer according to the state quantity. The display process is a process of displaying the predicted trajectory information by operating a display device.

Another aspect of the present disclosure provides a control method for a combination vehicle including a tractor and a trailer that is towed by the tractor. The control method includes a state quantity acquisition process, a predicted trajectory information calculation process, and a display process. The state quantity acquisition process is a process of acquiring a state quantity of the combination vehicle. The predicted trajectory information calculation process is a process of calculating predicted trajectory information of the trailer according to the state quantity. The display process is a process of displaying the predicted trajectory information by operating a display device.

Still another aspect of the present disclosure provides a control program for a combination vehicle including a tractor and a trailer that is towed by the tractor. The control program is a program that causes a computer to perform a state quantity acquisition process, a predicted trajectory information calculation process, and a display process. The state quantity acquisition process is a process of acquiring a state quantity of the combination vehicle. The predicted trajectory information calculation process is a process of calculating predicted trajectory information of the trailer according to the state quantity. The display process is a process of displaying the predicted trajectory information by operating a display device.

MODES FOR CARRYING OUT THE INVENTION

An embodiment of the present invention will be described with reference to the drawings.

"Configuration of Combination Vehicle"

Figure 1:
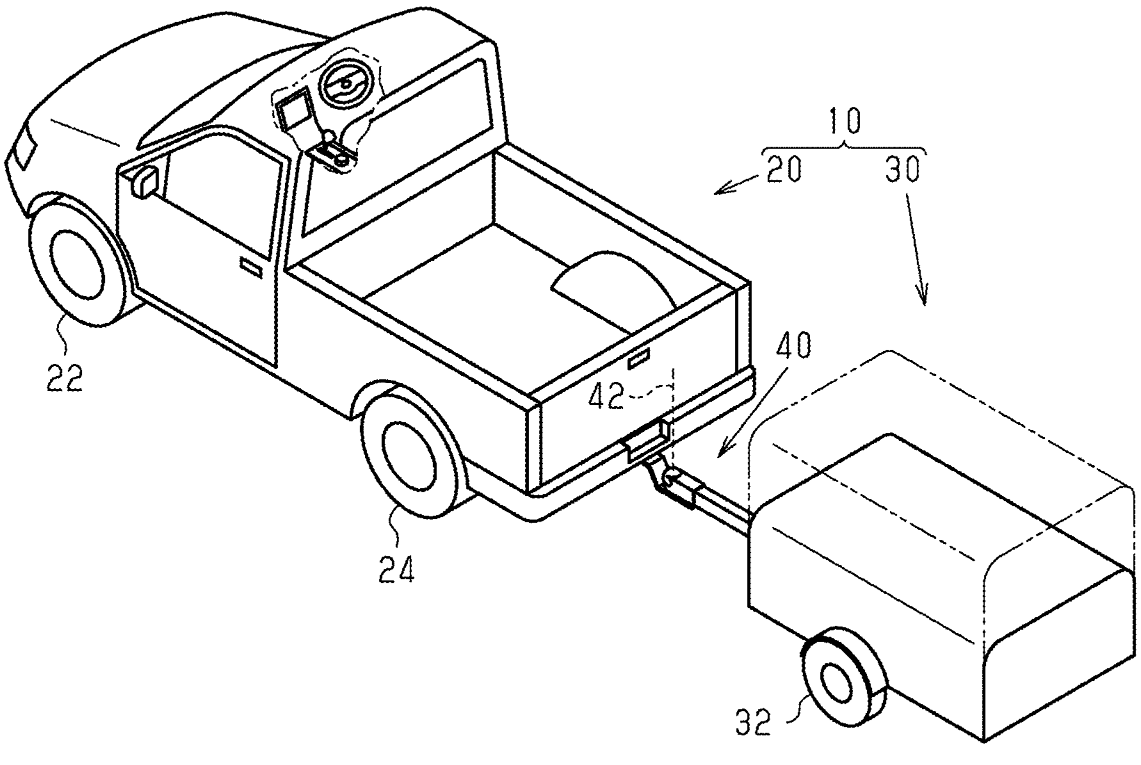
FIG. 1 is a perspective view showing the configuration of a combination vehicle according to an embodiment.

As shown in FIG. 1, a combination vehicle 10 includes a tractor 20 and a trailer 30. The tractor 20 includes front wheels 22 and rear wheels 24. The front wheels 22 include two wheels, namely a right front wheel and a left front wheel, and the rear wheels 24 include two wheels, namely a right rear wheel and a left rear wheel. FIG. 1 illustrates an enclosed box trailer as the trailer 30. The trailer 30 includes wheels 32. The wheels 32 include two wheels, namely a right wheel and a left wheel.

The trailer 30 is connected to the rear of the tractor 20 via a ball joint 40. The ball joint 40 is a member that connects the trailer 30 to the tractor 20 so that the trailer 30 can rotate about an axis 42. The axis 42 extends in the height direction of the tractor 20.

Figure 2:
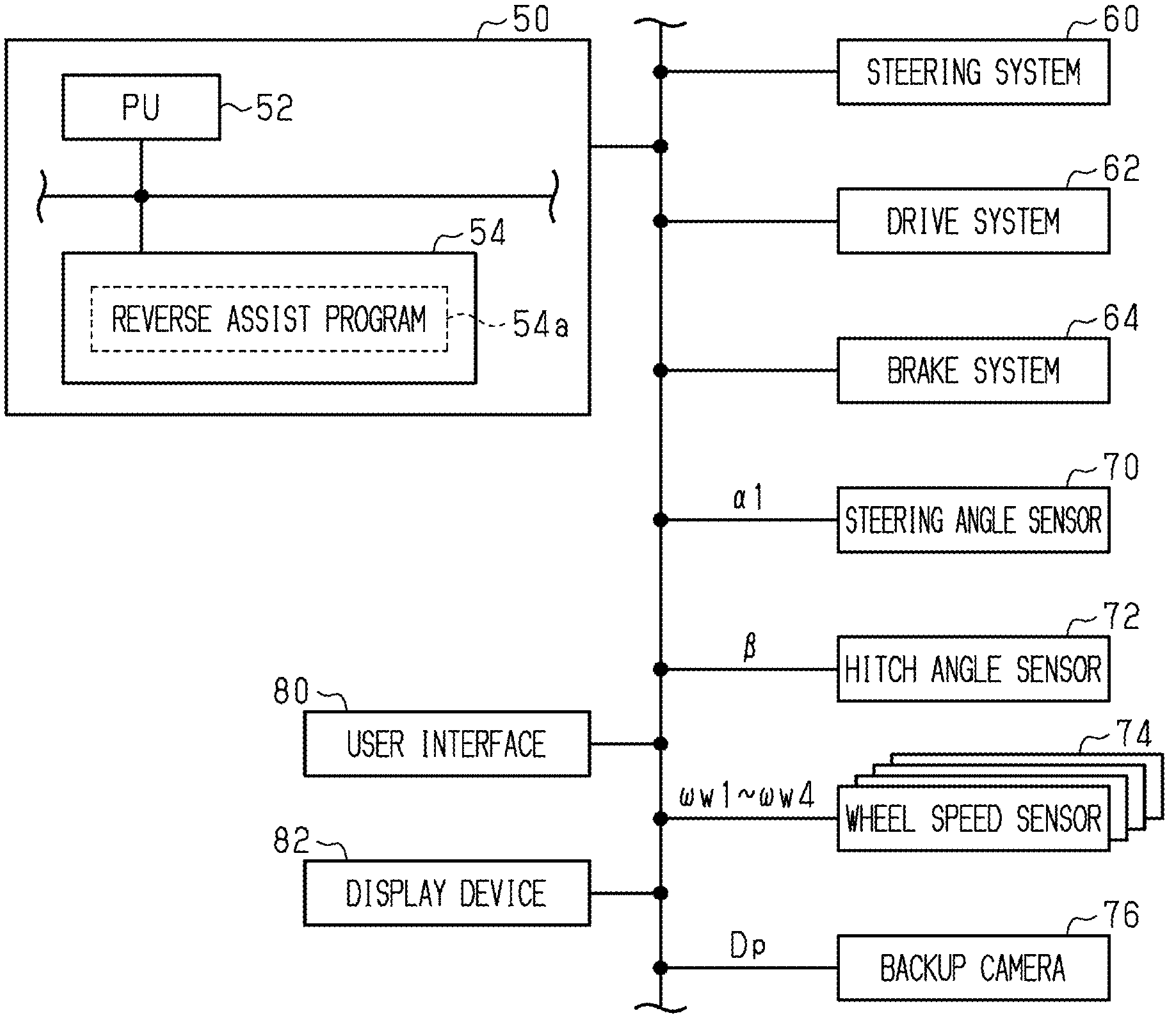
FIG. 2 is a block diagram showing the configuration of a control system according to the embodiment.

FIG. 2 shows some of members of the tractor 20. As shown in FIG. 2, the tractor 20 includes a control device 50. The control device 50 operates a steering system 60, a drive system 62, and a brake system 64 in order to control controlled variables of the combination vehicle 10 that is a controlled object. The controlled variables include a vehicle speed, a direction of travel, and a hitch angle. The hitch angle is an angle between the front-rear direction of the tractor 20 and the front-rear direction of the trailer 30.

The steering system 60 includes a steering actuator that steers steered wheels. The steered wheels are, for example, the front wheels 22 shown in FIG. 1. The steering system 60 may include a steering control device that operates the steering actuator. In that case, the "control device 50 operates the steering system 60" means that the control device 50 outputs command signals to the steering control device.

The drive system 62 includes at least one of the following two devices as a thrust generation device for the vehicle: an internal combustion engine and a rotating electrical machine. The drive system 62 may include a drive control device that controls the internal combustion engine and the rotating electrical machine. In that case, the "control device 50 operates the drive system 62" means that the control device 50 outputs command signals to the drive control device.

The brake system 64 includes at least one of the following two devices: a device that reduces the speed of rotation of the wheels using a frictional force, and a device that reduces the speed of rotation of the wheels by converting the power of the wheels to electrical energy. The device that reduces the speed of rotation of the wheels by converting the power of the wheels to electrical energy may be shared with the rotating electrical machine of the drive system. The brake system 64 may include a brake control device that controls the devices that reduce the speed of rotation of the wheels. In that case, the "control device 50 operates the brake system 64" means that the control device 50 outputs command signals to the brake control device.

The control device 50 refers to a steered angle $\alpha 1$ of the steered wheels detected by a steering angle sensor 70 in order to control the controlled variables. The steered angle $\alpha 1$ is a value that takes a positive sign for one of a right turn and a left turn and takes a negative sign for the other. The steered angle $\alpha 1$ is a turning angle of tires. For example, when the steering system 60 includes a rack and pinion mechanism, the steering angle sensor 70 may be a sensor that detects a pinion angle. In that case, however, the control device 50 performs a process of converting the pinion angle to the turning angle of the tires. Hereinafter, for convenience of description, the turning angle of the tires is regarded as a detection value of the steering angle sensor 70 even if the turning angle of the tires is obtained by the above conversion process.

The control device 50 also refers to a hitch angle $\beta$ detected by a hitch angle sensor 72. The hitch angle $\beta$ may take either a positive sign or a negative sign depending on the angle between the direction of travel of the tractor 20 from rear to front and the direction of travel of the trailer 30 from rear to front. For example, the hitch angle $\beta$ may take a positive sign when the direction of travel of the trailer 30 from rear to front deviates counterclockwise from the direction of travel of the tractor 20 from rear to front by less than 180°. The control device 50 also refers to wheel speeds $\omega w1$ to $\omega w4$ detected by wheel speed sensors 74. The wheel speeds $\omega w1$, $\omega w2$ are the rotational speed of the right front wheel 22 and the rotational speed of the left front wheel 22, respectively. The wheel speeds $\omega w3$, $\omega w4$ are the rotational speed of the right rear wheel 24 and the rotational speed of the left rear wheel 24, respectively. The control device 50 also refers to image data Dp that indicates an image of the rear of the tractor 20 captured by a backup camera 76.

The control device 50 sets control of the controlled variables according to the operating state of a user interface 80. The user interface 80 is used to transmit intentions of a user to the control device 50, such as an intention to select one of the following two drivings: autonomous driving and manual driving.

The control device 50 includes a PU 52 and a storage device 54. The PU 52 is a software processing device including at least one of the following: a CPU, a GPU, a TPU, etc. The storage device 54 stores a reverse assist program **54*a*. The reverse assist program 54*a* is a program that defines commands to cause the PU 52 to perform a reverse assist process. The reverse assist process is a process of automatically performing a process of steering the steered wheels when the combination vehicle 10 reverses. The reverse assist program 54*a*** is a program for reducing the burden of driving in reverse on the driver.

Figure 3:
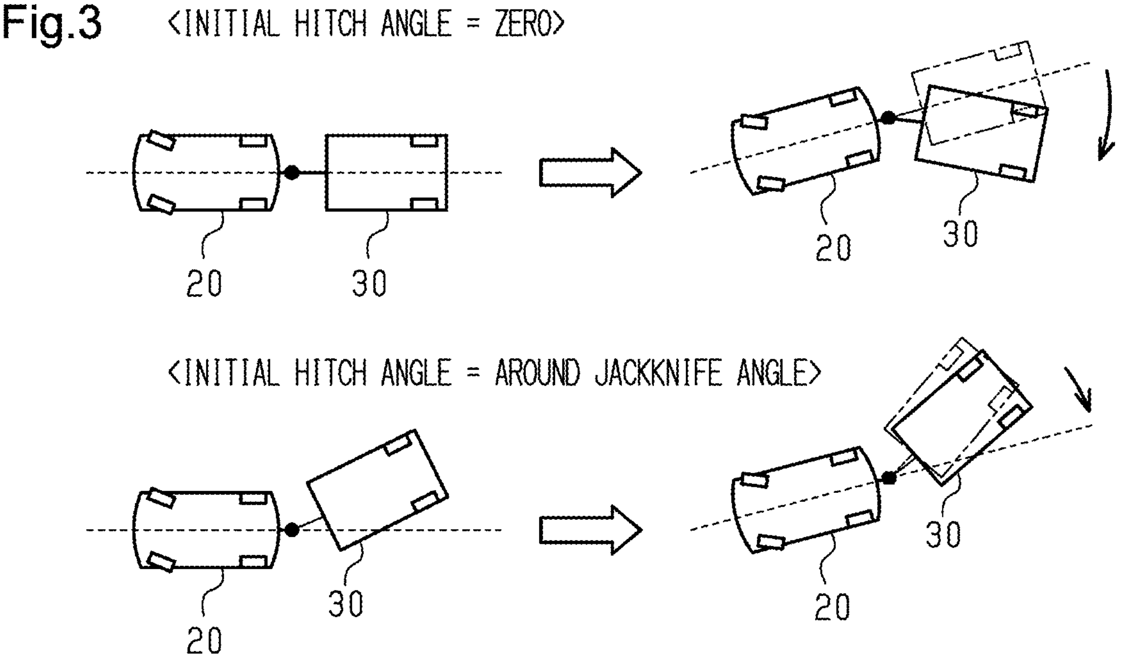
FIG. 3 is a diagram illustrating reverse control of the combination vehicle according to the embodiment.

That is, as shown in FIG. 3, when the combination vehicle 10 reverses, the behavior of the trailer 30 changes according to the hitch angle $\beta$ even when the steered angle of the tractor 20 is the same. Therefore, reverse control requires advanced driving skills. The reverse assist process by the reverse assist program **54*a* is a process of assisting the driver by controlling the steered angle $\alpha 1$ of the tractor 20. In the reverse assist process, accelerator operations and brake operations are left to the driver. In the reverse assist process, instructing to steer the trailer 30 is also left to the driver. This is because requirements for the control device 50 increase if the control device 50 also sets steering of the trailer 30**. Leasing part of instructions to the driver makes it possible to assist in reverse control by a relatively simple process.

"Model Used in Reverse Assist Process"

Figure 4:
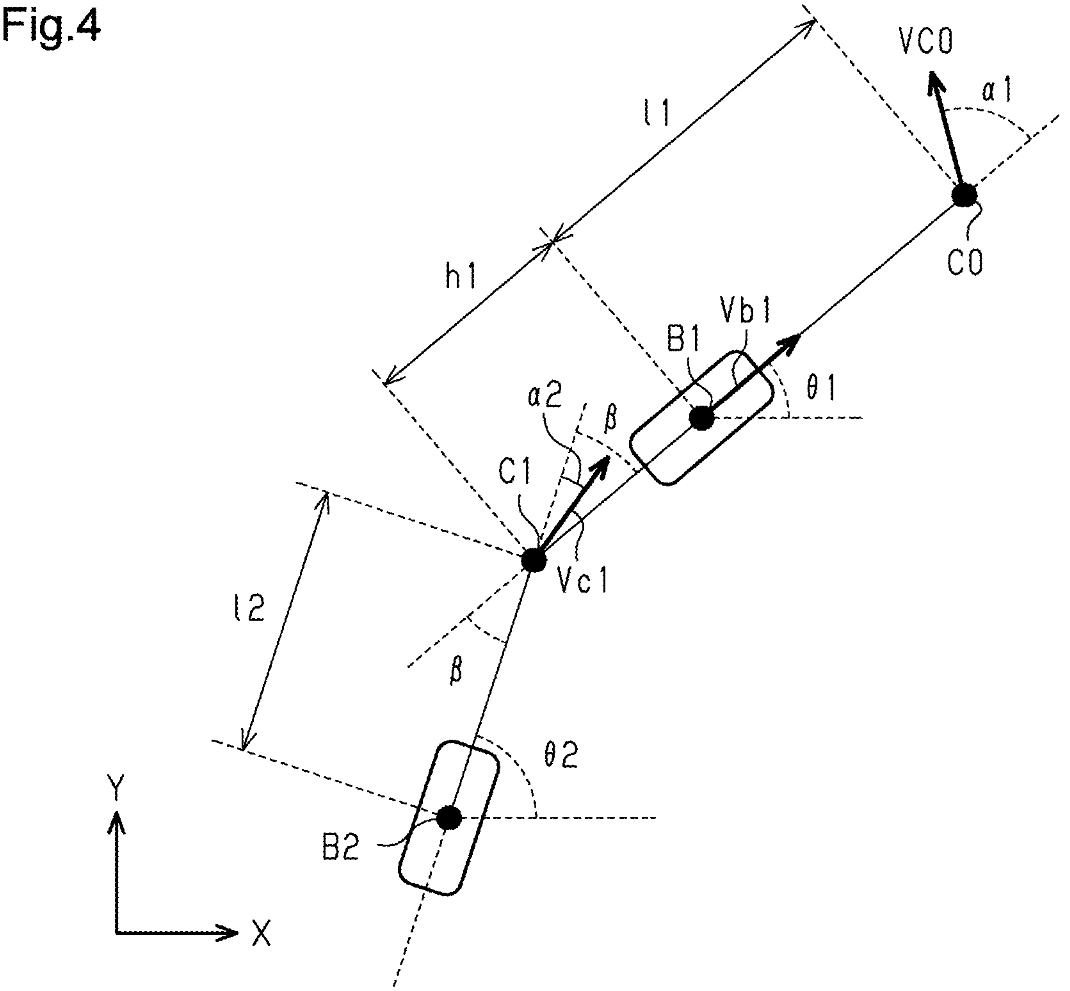
FIG. 4 is a diagram showing a model of the combination vehicle according to the embodiment.

FIG. 4 shows a model of the combination vehicle 10 that is used in the reverse assist process. In the model shown in FIG. 4, the pair of front wheels 22 of the tractor 20 is regarded as a single front wheel C0, and the pair of rear wheels 24 of the tractor 20 is regarded as a single rear wheel B1. That is, a two-wheel model is used for the tractor 20. The pair of wheels 32 of the trailer 30 is regarded as a single wheel B2. The angle between a line determined by the front wheel C0 and a hitch point C1 and a line determined by the hitch point C1 and the wheel B2 is the hitch angle $\beta$. The hitch point C1 corresponds to a portion at the axis 42 in FIG. 1. A front wheel speed VC0, namely the speed of the front wheel C0, is a vector that moves in the direction of the steered angle $\alpha 1$. The steered angle $\alpha 1$ is modeled as an angle between the direction in which the front wheel C0 moves and the line determined by the front wheel C0 and the hitch point C1. The direction of a vehicle speed Vb1 is parallel to the line determined by the front wheel C0 and the hitch point C1. In the following description, it is assumed that the vehicle speed Vb1 takes a positive sign when the tractor 20 travels forward. The angle between the direction of the vehicle speed Vb1 and the x direction in FIG. 4 is an angle $\theta 1$. The angle between the line connecting the wheel B2 and the hitch point C1 and the x direction is an angle $\theta 2$. A distance 11 between the front wheel C0 and the rear wheel B1, a distance h1 between the rear wheel B1 and the hitch point C1, and a distance 12 between the hitch point C1 and the wheel B2 are defined.

In the present embodiment, a virtual steering angle $\alpha 2$ that quantifies steering of the trailer 30 is defined as shown in FIG. 4. In other words, it is defined as an angle between the direction of the moving speed at the hitch point C1 and the front-rear direction of the trailer 30.

"Reverse Assist Process"

Figure 5:
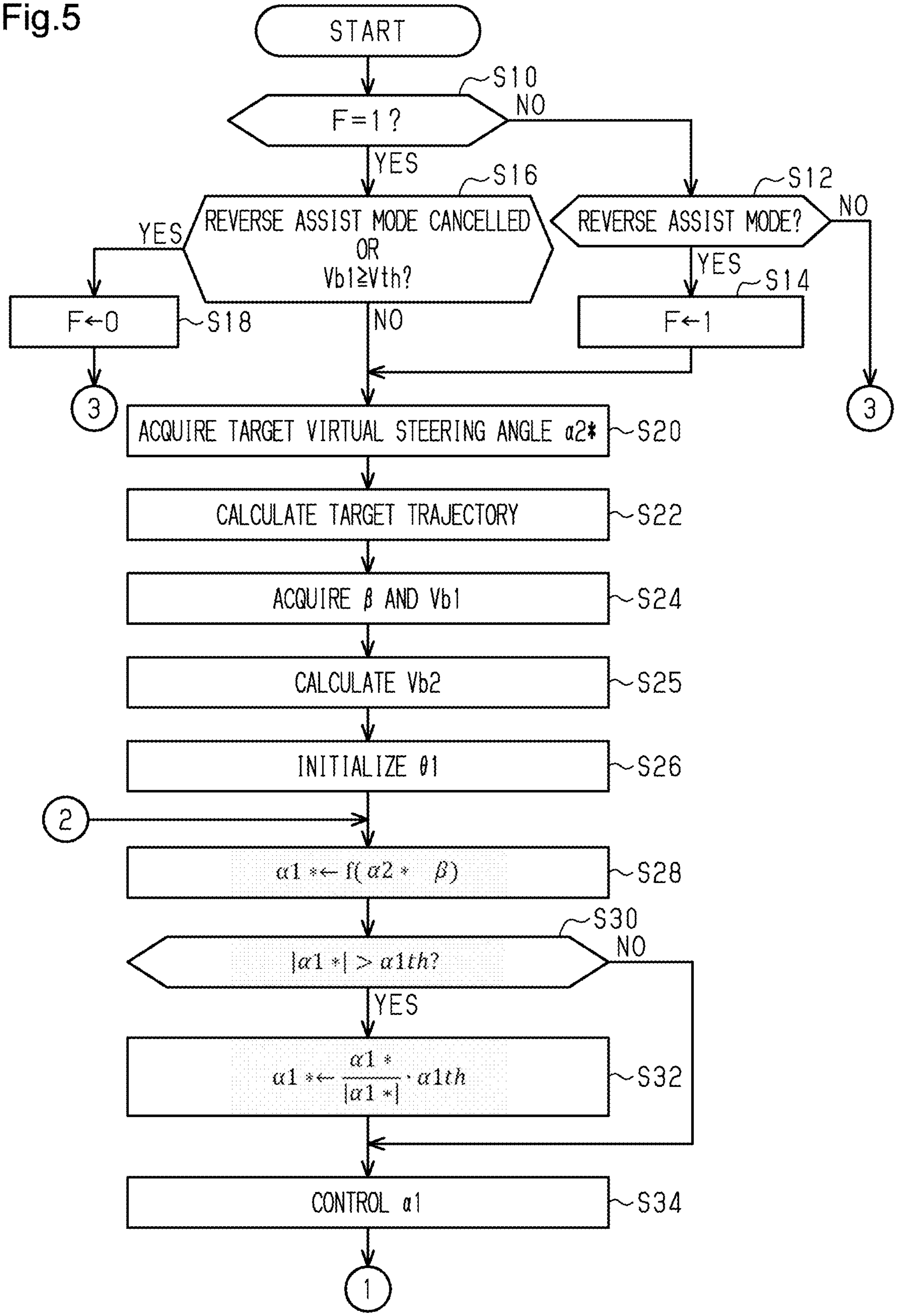
FIG. 5 is a flowchart showing the steps of a process that is performed by a control device according to the embodiment.
Figure 6:
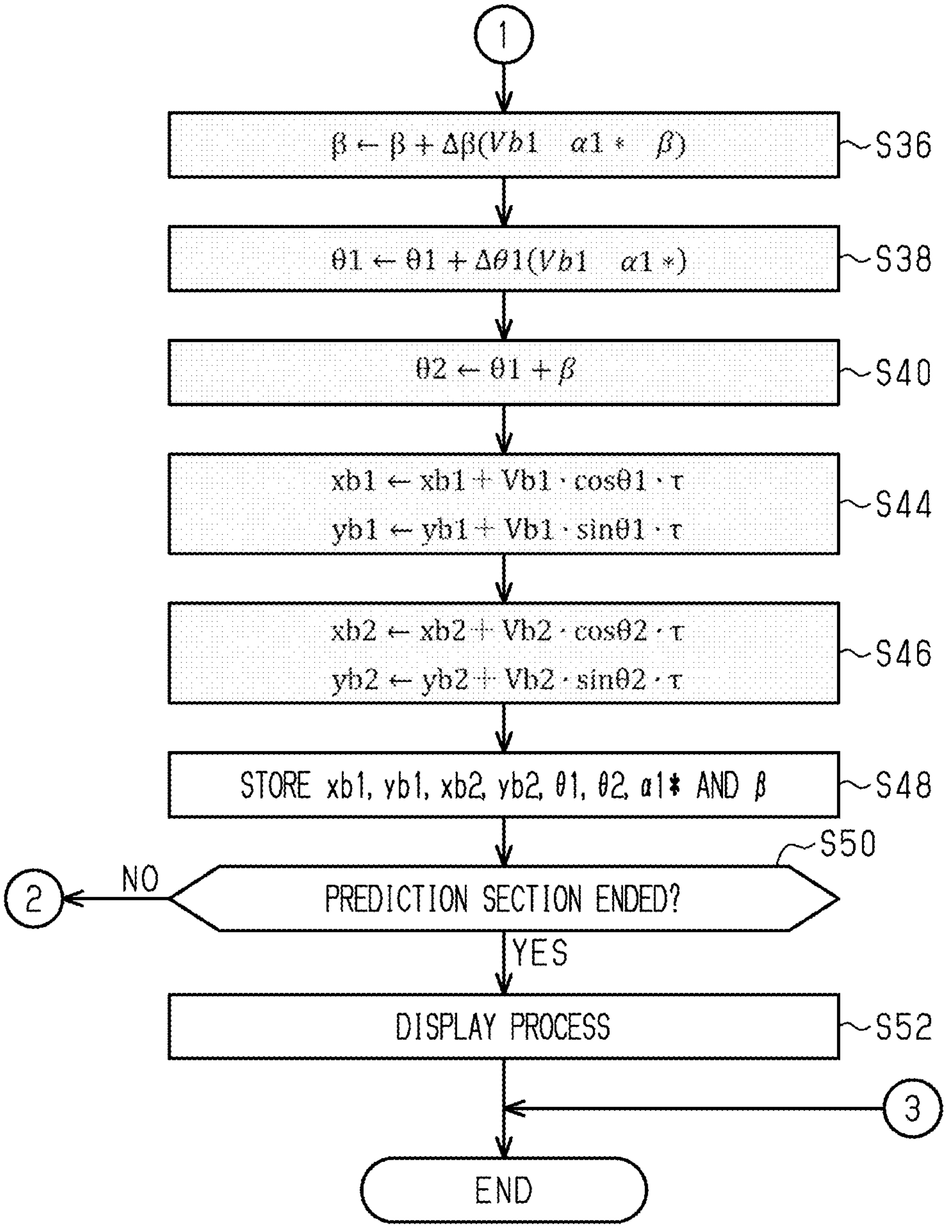
FIG. 6 is a flowchart showing the steps of the process that is performed by the control device according to the embodiment.

FIGS. 5 and 6 show the steps of a process related to the reverse assist process. The process shown in FIGS. 5 and 6 is implemented by the PU 52 repeatedly executing the reverse assist program 54*a* in, for example, predetermined cycles. In the following description, the numbers preceded by the letter "S" represent step numbers of each process.

In the series of processes shown in FIGS. 5 and 6, the PU 52 first determines whether a reverse assist flag F is "1" (S10). When the reverse assist flag F is "1," it indicates that a reverse assist mode for performing the reverse assist process is selected. On the other hand, when the reverse assist flag F is "0," it indicates that the reverse assist mode is not selected. When it is determined that the reverse assist flag F is "0" (S10: NO), the PU 52 determines whether the reverse assist mode is selected (S12). The PU 52 determines that the reverse assist mode is selected when an instruction to perform the reverse assist process is sent according to an input operation performed on the user interface 80. When the PU 52 determines that the reverse assist mode is selected (S12: YES), the PU 52 sets the reverse assist flag F to "1" (S14).

When the PU 52 determines that the reverse assist flag F is "1" (S10: YES), the PU 52 determines whether a logical disjunction of the following conditions (A), (B) is true (S16).

Condition (A): a condition that the reverse assist mode has been cancelled according to an input operation performed on the user interface 80.

Condition (B): a condition that the vehicle speed Vb1 is equal to or higher than a threshold Vth. In other words, the condition (B) is a condition that the magnitude of the forward traveling speed of the tractor 20 is equal to or higher than the threshold Vth. This process is a condition that the driver is presumed to be in a situation in which he or she has stopped reverse control of the combination vehicle 10 and is about to move the combination vehicle 10 significantly.

When the PU 52 determines that the logical disjunction is true (S16: YES), the PU 52 sets the reverse assist flag F to "0" (S18). When the PU 52 determines that the logical disjunction is false (S16: NO) or when the PU 52 completes the process of S14, the PU 52 acquires a target virtual steering angle α2* according to an input operation performed on the user interface 80 (S20). The target virtual steering angle α2* is a target value of a virtual steering angle α2. In the present embodiment, the target virtual steering angle α2* is specified by the driver. Specifically, for example, the input operation may be implemented by providing the user interface 80 with a dial having a positive correlation with the virtual steering angle α2. The rotation angle of the dial and the target virtual steering angle α2* need not necessarily have a proportional relationship.

The PU 52 then calculates a target trajectory Trt of the trailer 30 using the target virtual steering angle α2* as an input (S22). The PU 52 may calculate the target trajectory Trt using a two-wheel model in which the hitch point C1 is a front wheel that is a steered wheel and the rear wheel B1 is a rear wheel. More specifically, the PU 52 may calculate the target trajectory Trt by calculating the curvature of the target trajectory Trt according to the target virtual steering angle α2* and the distance 12. The target trajectory Trt may be the trajectory of a representative point of the trailer 30. The representative point may be, for example, the center point of the rear wheel B1. Alternatively, the representative point may be, for example, the center of gravity of the trailer 30.

The PU 52 then acquires the hitch angle β and the vehicle speed Vb1 (S24). The hitch angle β is the most recent detection value from the hitch angle sensor 72. The vehicle speed Vb1 is calculated by the PU 52 based on the wheel speeds ωw3, @w4. For example, the vehicle speed Vb1 may be a simple average value of the wheel speeds ωw3, ωw4.

The PU 52 then calculates the speed Vb2 of the wheel B2 (S25). More specifically, the PU 52 calculates the speed Vb2 from a geometric relationship according to the hitch angle β and the vehicle speed Vb1. The PU 52 then initializes the angle θ1 (S26). In this example, the PU 52 sets the angle θ1 to "90°." This is a setting for setting the front-rear direction of the tractor 20 as the y direction of the coordinate system shown in FIG. 4.

The PU 52 then calculates a target steered angle α1* that is a steered angle for achieving the target virtual steering angle α2* (S28). The process of S28 is a process in which the target virtual steering angle α2* and the hitch angle β are input and the target steered angle α1* is output. That is, according to the model shown in FIG. 4, the following equation (c1) holds between the steered angle α1 and the virtual steering angle α2.

$$\alpha 1 = \arctan\{(l1/h1)\cdot\tan(-\alpha 2-\beta)\} \quad \text{(c1)}$$

When the virtual steering angle α2 on the right side of the above equation (c1) is replaced with the target virtual steering angle α2*, the left side becomes the target steered angle α1*.

The PU 52 may calculate the target steered angle α1* based on an equation according to the equation (c1). The PU 52 may perform a map calculation to calculate the target steered angle α1*. This can be implemented by storing map data in advance in the storage device 54. The map data is data that uses the target virtual steering angle α2* and the hitch angle β as input variables and the target steered angle α1* as an output variable. The map data is a data set of discrete values of the input variables and values of the output variable corresponding to the values of the input variables. The map calculation may be a process in which, when the values of the input variables match any of the values of the input variables in the map data, a corresponding value of the output variable in the map data is output as a calculation result. The map calculation may be a process in which, when the values of the input variables do not match any of the values of the input variables in the map data, a value obtained by interpolating a plurality of values of the output variable included in the map data is output as a calculation result. Alternatively, the map computation may be a process in which, when the values of the input variables do not match any of the values of the input variables in the map data, the value of the output variable in the map data that corresponds to the values of the input variables in the map data closest to the values of the input variables, out of the plurality of values of the input variables included in the map data, is output as a calculation result.

The PU 52 then determines whether the magnitude of the target steered angle α1* is larger than an upper limit value α1th (S30). The upper limit value α1th is the maximum possible value of the steered angle α1. This process is a process of determining whether the steered angle α1 that achieves the target virtual steering angle α2* can actually be achieved. When the PU 52 determines that the target steered angle α1* is larger than the upper limit value α1th (S30: YES), the PU 52 reduces the magnitude of the target steered angle α1* to the upper limit value α1th (S32).

When the PU 52 completes the process of S32 or when NO in the process of S30, the PU 52 operates the steering system 60 to control the steered angle α1 toward the target steered angle α1* (S34).

Referring to FIG. 6, the PU 52 predicts a future hitch angle β, namely the hitch angle β in a predetermined time t (S36). According to the model shown in FIG. 4, the amount of change Δβ in hitch angle β during the predetermined time τ is given by the following equation (c2).

$$\Delta\beta = -(Vb1/l2)\cdot\sin\beta\cdot\tau - \{Vb1/(l1\cdot l2)\}\cdot(l2 + h1\cdot\cos\beta)\cdot(\tan\alpha1^*)\cdot\tau \quad \text{(c2)}$$

In the process of S36, the PU 52 may calculate a predicted value of the hitch angle β by adding the amount of change Δβ calculated by the above equation (c2) to the hitch angle β. Alternatively, the process of S36 may be configured to include a process in which the PU 52 calculates the amount of change Δβ by a map calculation using map data stored in advance. The map data is data that uses the vehicle speed Vb1, the hitch angle β, and the target steered angle α1* as input variables and the amount of change Δβ in hitch angle β as an output variable.

The PU 52 then calculates a future angle θ1, namely the angle θ1 in the predetermined time τ (S38). The amount of change 401 in angle θ1 during the predetermined time τ is given by the following equation (c3).

$$\Delta\theta1 = (Vb1/l1)\cdot\tan(\alpha1^*) \quad \text{(c3)}$$

In the process of S38, the PU 52 may calculate a predicted value of the angle θ1 by adding the amount of change Δθ1 calculated by the above equation (c3) to the angle θ1. Alternatively, in the process of S38, the PU 52 may calculate the amount of change Δθ1 by a map calculation using map data stored in advance. The map data is data that uses the vehicle speed Vb1 and the target steered angle α1* as input variables and the amount of change Δθ1 as an output variable.

The PU 52 substitutes the sum of the hitch angle β calculated in the process of S36 and the angle θ1 calculated in the process of S38 for the future angle θ2, namely the angle θ2 in the predetermined time τ (S40). The PU 52 then receives the vehicle speed Vb1 and the angle θ1 as inputs and calculates future tractor position coordinates (xb1, yb1), namely tractor position coordinates (xb1, yb1) in the predetermined time τ (S44). The amount of change in x-component xb1 of the tractor position coordinates during the predetermined time τ is "Vb1·cos θ1." The amount of change in y-component yb1 of the tractor position coordinates during the predetermined time τ is "Vb1·sin θ1."

The PU 52 then receives the speed Vb2 and the angle θ2 as inputs and calculates the future trailer position coordinates (xb2, yb2), namely the trailer position coordinates (xb2, yb2) in the predetermined time τ (S46). The amount of change in x-component xb2 of the trailer position coordinates during the predetermined time τ is "Vb2·cos θ2." The amount of change in y-component yb2 of the trailer position coordinates during the predetermined time τ is "Vb2·sin θ2."

The PU 52 then temporarily stores the values calculated in the processes of S28 to S32 and S36 to S46 in the storage device 54 (S48). That is, the PU 52 temporarily stores in the storage device 54 the tractor position coordinates (xb1, yb1), the trailer position coordinates (xb2, yb2), the angles θ1, θ2, the target steered angle α1*, and the hitch angle β.

The PU 52 then determines whether a prediction section has ended (S50). The prediction section is a section in which the combination vehicle 10 travels for a predetermined time. The predetermined time may be, for example, about a few seconds. The prediction section may have a positive correlation with the absolute value of the vehicle speed Vb1, or need not be dependent on the vehicle speed Vb1.

When the PU 52 determines that the prediction section has not ended (S50: NO), the routine returns to the process of S28. On the other hand, when the PU 52 determines that the prediction section has ended (S50: YES), the PU 52 displays the predicted trajectory Trp and the target trajectory Trt on a display device 82 shown in FIG. 1 (S52). It is desirable that the process of S34 be performed only once before the determination in the process of S50 is YES.

At the time it is determined that the prediction section has ended, N hitch angles β that are ahead in time of the hitch angle β acquired in the process of S24 has been stored in the storage device 54. N is an integer of 2 or more. These are predicted values obtained at intervals of the predetermined time t. The tractor position coordinates (xb1, yb1), trailer position coordinates (xb2, yb2), angles θ1, θ2, and target steered angles α1* at the timings synchronized with the N hitch angles β have also been stored in the storage device 54.

The N trailer position coordinates (xb2, yb2) indicate predicted positions of the representative point of the trailer 30 that are separated from each other by the predetermined time τ. The predicted trajectory Trp can be obtained by connecting them.

The process of S52 may be a process of sending the N trailer position coordinates (xb2, yb2) to the display device 82. The process of S52 may be a process of finding a curve that fits the N trailer position coordinates (xb2, yb2) and sending parameters that identify the curve to the display device 82. In this case, the communication load can be reduced. The display device 82 may have only a simple display function, and the PU 52 may generate an image to be displayed on the display device 82.

Figure 7A:
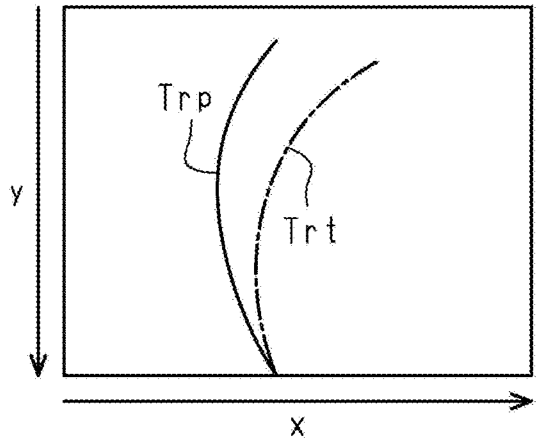
FIGS. 7A and 7B are diagrams showing a method for displaying a predicted trajectory.
Figure 7B:
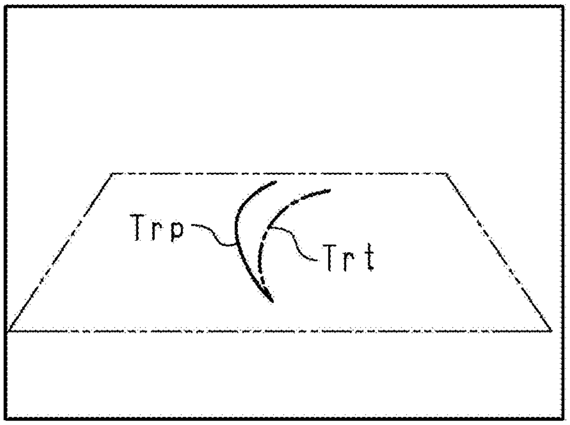

The display device 82 superimposes the predicted trajectory Trp and the target trajectory Trt on an image captured by the backup camera 76, and displays the resultant image. FIG. 7A shows the predicted trajectory Trp obtained by connecting the trailer position coordinates (xb2, yb2), and the target trajectory Trt. According to the process of S26, the trailer position coordinates (xb2, yb2) are coordinate components of a coordinate system in which the y-axis is parallel to the front-rear direction of the tractor 20. However, in order to match the trailer position coordinates (xb2, yb2) with the image from the backup camera 76, the PU 52 displays point cloud data etc. obtained by projective transformation of the trailer position coordinates (xb2, yb2) as shown in FIG. 7B.

Figure 8A:
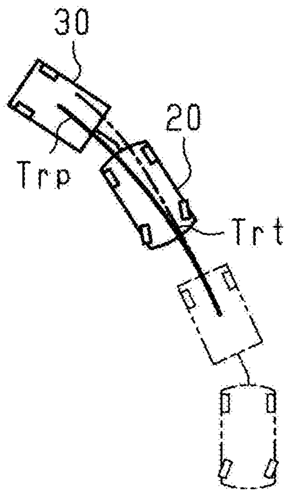
FIGS. 8A and 8B are diagrams showing a display example according to the embodiment.
Figure 8B:
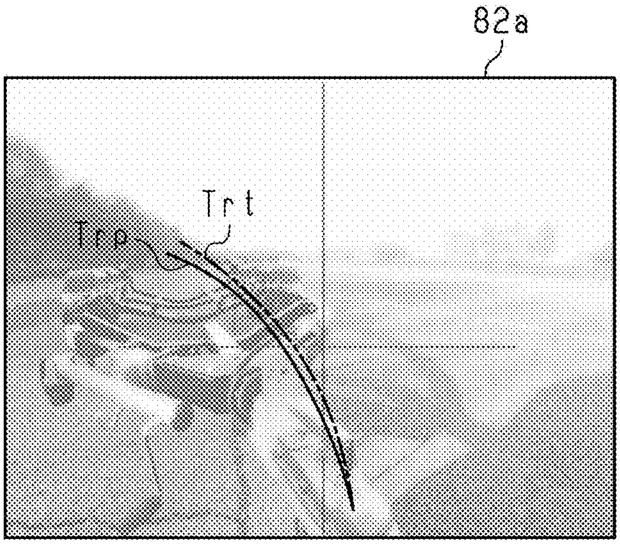

FIGS. 8A and 8B show an example of the image that is displayed on a display screen 82*a* of the display device 82. Specifically, FIG. 8A shows the state of the combination vehicle 10, and FIG. 8B shows an example of the display on the display screen 82*a*. In FIGS. 8A and 8B, the predicted trajectory Trp is shown by a continuous line, and the target trajectory Trt is shown by a long dashed short dashed line. However, the predicted trajectory Trp and the target trajectory Trt may be displayed in different colors on the actual display screen 82$a$ so that they can be distinguished from each other. The example shown in FIGS. 8A and 8B illustrates a case where the driver wants to turn right while reversing.

Figure 9A:
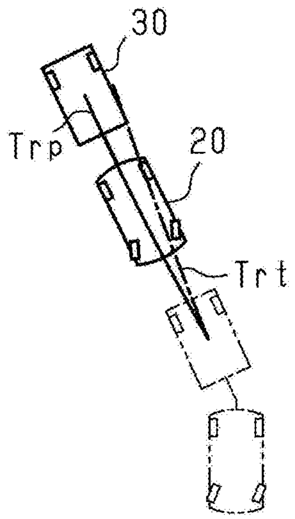
FIGS. 9A and 9B are diagrams showing a display example according to the embodiment.
Figure 9B:
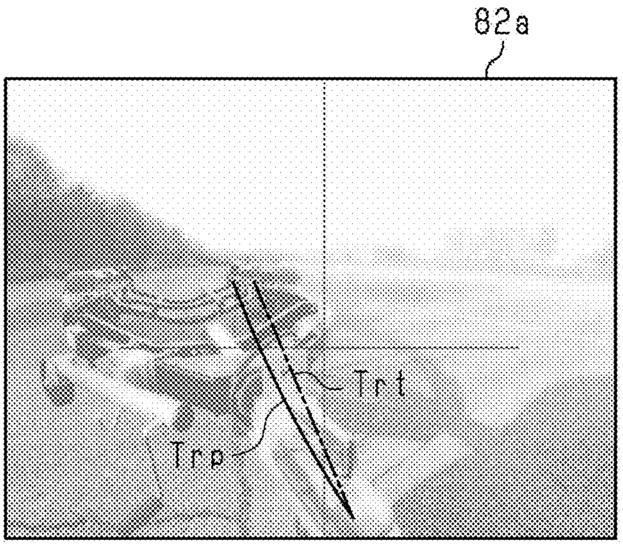

FIGS. 9A and 9B show another example of the image that is displayed on the display screen 82$a$ of the display device 82. FIGS. 9A and 9B correspond to FIGS. 8A and 8B. The example shown in FIGS. 9A and 9B shows a case where the driver wants to switch from turning right while reversing to reversing straight.

Figure 10A:
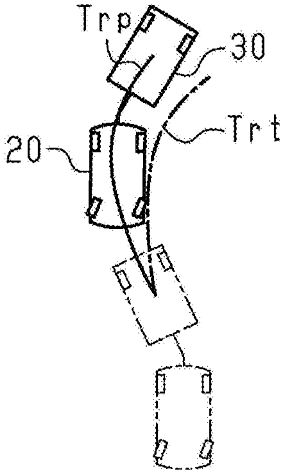
FIGS. 10A and 10B are diagrams showing a display example according to the embodiment.
Figure 10B:
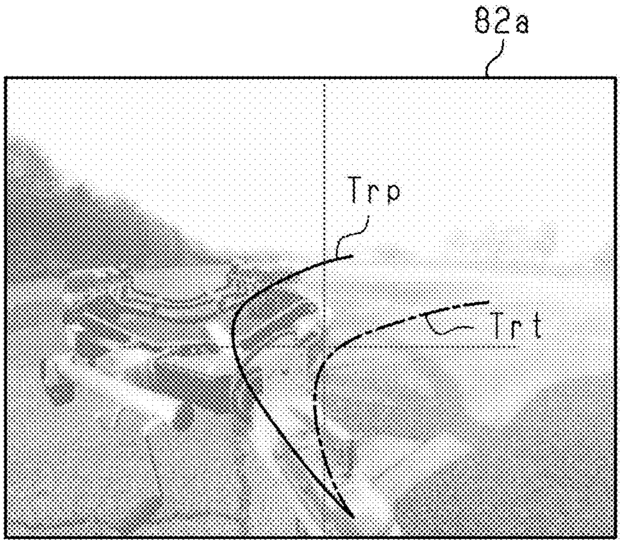

FIGS. 10A and 10B show still another example of the image that is displayed on the display screen 82$a$ of the display device 82. FIGS. 10A and 10B correspond to FIGS. 8A and 8B. The example shown in FIGS. 10A and 10B illustrates a case where the driver wants to switch from turning right while reversing to turning left while reversing. In the display example shown in FIGS. 10A and 10B, the predicted trajectory Trp is significantly deviated from the target trajectory Trt. This is a state in which, due to the processes of S30 to S32, the predicted trajectory Trp does not change even when the target virtual steering angle $\alpha 2^*$ is manipulated by an input operation performed on the user interface 80. A situation in which the predicted trajectory Trp does not change is likely to occur when the magnitude of the hitch angle $\beta$ is large, as shown in FIGS. 11A and 11B.

Figure 11B:
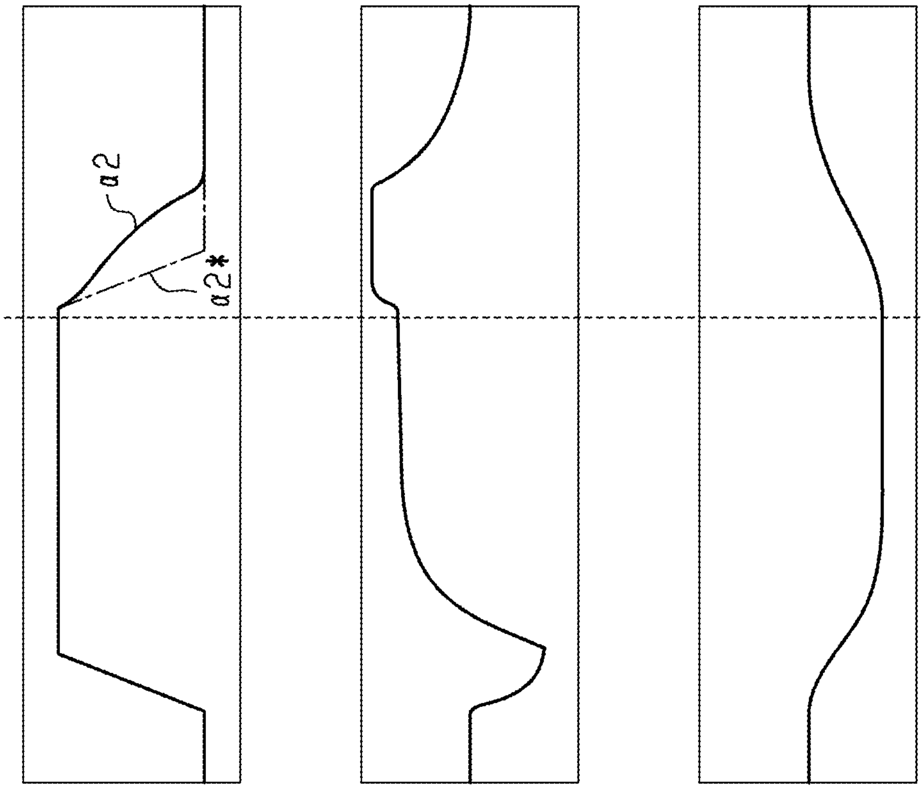
FIGS. 11A and 11B are timing charts illustrating control of a virtual steering angle according to the embodiment.
Figure 11A:
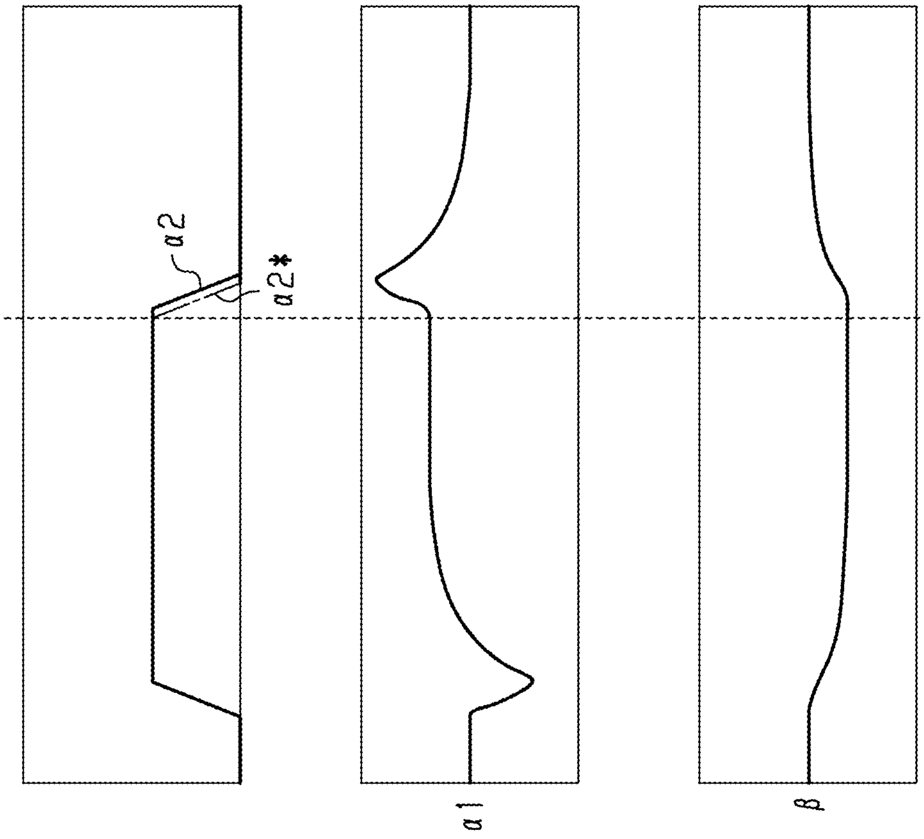

FIG. 11A shows a case where the target virtual steering angle $\alpha 2^*$ is turned back while the magnitude of the hitch angle $\beta$ is small. FIG. 11B shows a case where the target virtual steering angle $\alpha 2^*$ is turned back while the magnitude of the hitch angle $\beta$ is small.

As shown in FIGS. 11A and 11B, when the target virtual steering angle $\alpha 2^*$ is turned back while the magnitude of the hitch angle $\beta$ is large, the virtual steering angle $\alpha 2$ cannot follow the target virtual steering angle $\alpha 2^*$.

If the predicted trajectory Trp does not change even though the target virtual steering angle $\alpha 2^*$ is manipulated, the driver may be confused because he or she does not know why the predicted trajectory Trp does not change. As a solution to this, in the present embodiment, the target trajectory Trt is also displayed. Accordingly, when the difference between the target trajectory Trt and the predicted trajectory Trp is large, the driver can be notified that the virtual steering angle $\alpha 2$ cannot be controlled to a desired angle by steering the tractor 20.

The embodiment described above further has the following functions and effects.

(1) The PU 52 sets one of the axes of the coordinate system that defines the trailer coordinate components to be parallel to the front-rear direction of the tractor 20 at that time. This allows the trailer coordinate components to be easily matched with the image from the backup camera 76.

(2) The PU 52 performs projective transformation on the trailer coordinate components. This allows the trailer coordinate components to be appropriately matched with the image from the backup camera 76.

(3) The PU 52 calculates the predicted trajectory of the trailer 30 using as an input the target steered angle $\alpha 1^*$ whose magnitude is limited to the upper limit value $\alpha 1$th or less. In other words, the PU 52 calculates the predicted trajectory of the trailer 30 in the case of controlling the actual virtual steering angle $\alpha 2$ to as close as possible to the target virtual steering angle $\alpha 2^*$ within a range in which the magnitude of the steered angle $\alpha 1$ is equal to or less than the upper limit value alth. Although the virtual steering angle $\alpha 2$ can be controlled by steering the tractor 20, the range of values that the virtual steering angle $\alpha 2$ can take is limited by the range of values that the steered angle $\alpha 1$ can take. Therefore, the PU 52 calculates the predicted trajectory of the trailer 30 in the case of controlling the actual virtual steering angle $\alpha 2$ to as close as possible to the target virtual steering angle $\alpha 2^*$ within the range in which the magnitude of the steered angle $\alpha 1$ is equal to or less than the upper limit value $\alpha 1$th. This allows the predicted trajectory to be a feasible trajectory for the trailer 30.

(4) The PU 52 performs a process of displaying the target trajectory that is the trajectory of the trailer 30 when the virtual steering angle $\alpha 2$ is set to the target virtual steering angle $\alpha 2^*$. In the combination vehicle 10, when, for example, the magnitude of the hitch angle $\beta$ is relatively large, the behavior of the trailer 30 tends to change very little no matter what value the steered angle $\alpha 1$ is set to. In this case, even if the driver changes the target virtual steering angle $\alpha 2^*$ to a large degree, the displayed predicted trajectory changes very little. In such a situation, the driver may be confused by the fact that the predicted trajectory does not change even though he or she changed the target virtual steering angle $\alpha 2^*$. As a solution to this, the PU 52 also displays the target trajectory determined without considering the range of values that the steered angle $\alpha 1$ can take. Even in a situation where the behavior of the trailer 30 changes very little no matter what value the steered angle $\alpha 1$ is set to, the target trajectory changes significantly with a change in target virtual steering angle $\alpha 2^*$. Therefore, the predicted trajectory is deviated from the target trajectory. The driver can thus be notified that it is the situation in which the behavior of the trailer 30 changes very little no matter what value the steered angle $\alpha 1$ is set to.

(5) The PU 52 controls the virtual steering angle $\alpha 2$ toward the target virtual steering angle $\alpha 2^*$ by controlling the steered angle $\alpha 1$ toward the target steered angle $\alpha 1^*$ while keeping the magnitude of the target steering angle $\alpha 1^*$ equal to or less than the upper limit value $\alpha 1$th. This allows the target steered angle $\alpha 1^*$ to be set to a value that achieves the target virtual steering angle $\alpha 2^*$ as much as possible under the condition that the magnitude of the target steering angle $\alpha 1^*$ is equal to or less than the upper limit value $\alpha 1$th.

(6) The PU 52 predicts a future value of the hitch angle $\beta$ using the target steered angle $\alpha 1^*$ subjected to the upper limit guard process as an input. The PU 52 performs the following three processes a plurality of times: the process of calculating the target steered angle $\alpha 1^*$ using the predicted hitch angle $\beta$ as an input, the process of predicting the hitch angle $\beta$ using the target steered angle $\alpha 1^*$ subjected to the upper limit guard process as an input, and the process of predicting displacement of the trailer 30 using the predicted hitch angle $\beta$ and the target steered angle $\alpha 1^*$ subjected to the upper limit guard process as inputs. There is a predetermined correlation among the virtual steering angle $\alpha 2$, the hitch angle $\beta$, and the steered angle $\alpha 1$. Therefore, when the hitch angle $\beta$ changes, the target steered angle $\alpha 1^*$ that achieves the target virtual steering angle $\alpha 2^*$ changes. Accordingly, the PU 52 can accurately calculate a predicted trajectory over a relatively long time by performing the above three processes a plurality of times.

(7) The PU 52 performs the process of assisting in steering and the process of displaying the above trajectories, both in the reverse assist mode. Reverse control of the combination vehicle 10 requires advanced driving skills. In this regard, the PU 52 can reduce the burden of steering the tractor 20 on the driver by performing the process of assisting in steering in the reverse assist mode. Moreover, the above display process can provide information that is useful for the driver to specify the direction in which the trailer 30 should travel.

(8) The PU 52 continues to perform the above display process even when the combination vehicle 10 switches from reversing to traveling forward in the reverse assist mode. When the behavior of the trailer 30 becomes inappropriate during reverse control of the combination vehicle 10, the driver may move the combination vehicle 10 forward to start over the reverse control. In this case, continuing to perform the display process allows the driver to know how much the trailer 30 needs to move forward in order to achieve the desired behavior of the trailer 30.

(9) The PU 52 cancels the reverse assist mode when the forward traveling speed of the combination vehicle 10 becomes equal to or higher than the threshold Vth. When the forward traveling speed is high, it is considered that the driver does not desire reverse control and wants to move the combination vehicle 10. Therefore, when the forward traveling speed becomes equal to or higher than the threshold Vth, the PU 52 cancels the reverse assist mode, which can save the driver the trouble of manually canceling the reverse assist mode.

(10) The PU 52 superimposes the predicted trajectory information on the image of the outside of the combination vehicle 10 captured by the backup camera 76. Superimposing the predicted trajectory information on the image from the backup camera 76 makes it easy to accurately grasp the behavior of the trailer 30.

Other Embodiments

The above embodiment can be modified as follows. The above embodiment and the following modifications can be combined unless technical contradictions arise.

"State Quantity Acquisition Process"

In the process of S24, the PU 52 acquires the hitch angle β detected by the hitch angle sensor 72. However, the present disclosure is not limited to this. For example, the PU 52 may acquire an estimated value of the hitch angle β. For example, this can be implemented by the PU 52 estimating the hitch angle β to be zero when straight traveling has continued a predetermined distance, and then sequentially updating the hitch angle β according to the amount of change Δβ given by the above equation (c2). The amount of change Δβ herein is not a predicted value of the amount of change in future hitch angle β but an estimated value of the amount of change.

"Virtual Steering Angle"

The virtual steering angle that is a variable quantifying steering of the trailer is not limited to the definition illustrated in the above embodiment. For example, the angle between the front-rear direction of the tractor 20 and the direction of travel of the hitch point C1 may be defined as the virtual steering angle.

"Predicted Trajectory Information Calculation Process"

The processes of S30, S32, etc. are not essential for the process of calculating the predicted trajectory of the trailer 30 in the case of controlling the actual virtual steering angle α2 to as close as possible to the target virtual steering angle α2* within the range in which the magnitude of the steered angle α1 is equal to or less than the upper limit value α1th. The process of calculating the predicted trajectory may include a process of converting the upper limit value α1th to an upper limit value of the magnitude of the virtual steering angle α2 based on, for example, an equation obtained by inversely solving the above equation (c1). In this case, the PU 52 may perform the upper limit guard process on the target virtual steering angle α2* using the upper limit value of the magnitude of the virtual steering angle α2. The PU 52 may then perform the processes of S34 and the subsequent steps using the value of the target virtual steered angle α1* to which the target virtual steering angle α2* subjected to the upper limit guard process is converted using the above equation (c1).

The PU 52 need not necessarily set the initial value of the angle θ1 to "90°" when predicting the trajectory. For example, the PU 52 may compare map data with the front-rear direction of the tractor 20, and set the angle between a predetermined axis in a coordinate system defined as desired on the map data and the front-rear direction of the tractor 20 to the initial value of the angle θ1 in the predicted trajectory information calculation process.

"Steering Process"

The steering process of controlling the steered angle α1 so that the virtual steering angle α2 becomes closer to the target virtual steering angle α2* is not limited to the process that is performed in the reverse assist mode. For example, the steering process may be a process of automatically steering the tractor 20 when the combination vehicle 10 is moving forward.

"Condition for Canceling Steering Process"

The above embodiment illustrates that the condition for canceling the reverse assist mode is that the logical disjunction of the conditions (A), (B) is true. However, the present disclosure is not limited to this. For example, a condition that the combination vehicle 10 has moved forward may be used instead of the condition (B). Alternatively, for example, the cancelling condition may be the condition (A) alone.

"Display Process"

The PU 52 need not necessarily display the target trajectory Trt in addition to the predicted trajectory Trp of the trailer 30. When displaying only the predicted trajectory Trp, the PU 52 may also display, for example, a region that is feasible as a travel trajectory of the trailer 30. In this case, this region becomes narrow in the case where the travel path of the trailer 30 changes very little even when the steered angle α1 is changed. Therefore, the driver can be notified that it will be difficult to change the travel trajectory of the trailer 30 even if the virtual steering angle α2 is changed. For example, instead of displaying the above region, the PU 52 may notify the driver that it will be difficult to change the trajectory of the trailer 30 by manipulating the target virtual steering angle α2*, when the width of the region is equal to or less than a predetermined value and the driver manipulates the target virtual steering angle α2*. This process may be a process of displaying visual information, or may be a process of giving a notification by voice.

For example, the PU 52 may display only the predicted trajectory Trp when the difference between the predicted trajectory Trp and the target trajectory Trt is equal to or smaller than a predetermined value as in the cases illustrated in FIGS. 8A to 9B. That is, the PU 52 may sequentially determine whether the difference between the predicted trajectory Trp and the target trajectory Trt is equal to or less than the predetermined value, and need not display the target trajectory Trt when it is determined that the difference is equal to or less than the predetermined value. The difference between the predicted trajectory Trp and the target trajectory Trt being equal to or less than the predetermined value may mean that, for example, the average value of the difference between the positions on the predicted trajectory Trp and the target trajectory Trt at the same timing is equal to or less than the predetermined value. Alternatively, the difference between the predicted trajectory Trp and the target trajectory Trt being equal to or less than the predetermined value may mean that, for example, the difference between the positions on the predicted trajectory Trp and the target trajectory Trt at the same timing is not larger than the predetermined value at any position.

Figure 12A:
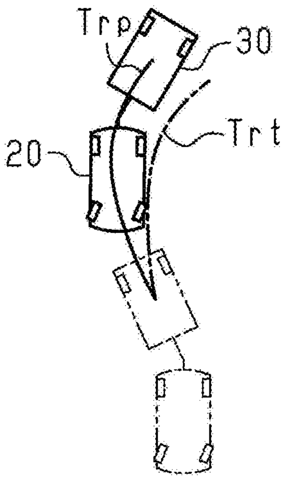
FIGS. 12A and 12B are diagrams showing a display example according to a modification of the embodiment.
Figure 12B:
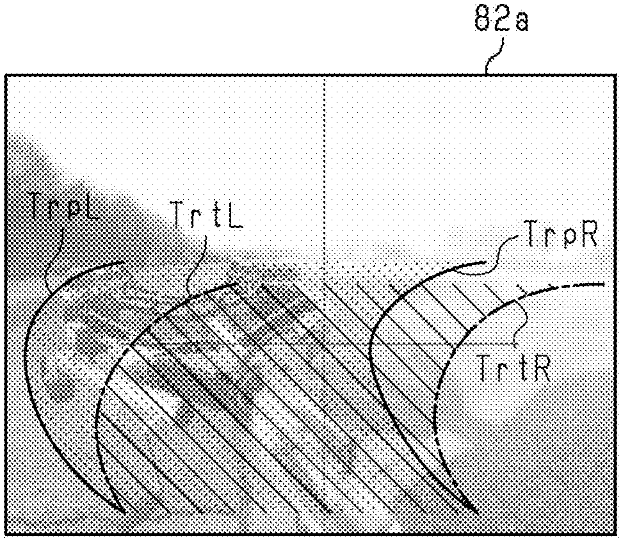

The predicted trajectory information to be displayed is not limited to the predicted trajectory Trp. For example, as shown in FIGS. 12A and 12B, the predicted trajectory Trp may be provided with a margin. FIGS. 12A and 12B correspond to FIGS. 8A and 8B. In FIGS. 12A and 12B, the region determined by a pair of boundaries TrpL, TrpR of the predicted trajectory is displayed as a dotted region. The region determined by a pair of boundaries TrtL, TrtR of the target trajectory is hatched. However, these two regions may be distinguished from each other by displaying them in different colors on the actual display screen 82*a*.

A process of providing the predicted trajectory Trp with a margin may be implemented as follows according to whether the determination in the process of S30 is NO. When NO in the process of S30, the PU 52 may perform the processes of S36 to S46 by "$\alpha1^*+\delta$" and "$\alpha1^*-\delta$" using the target steered angle $\alpha1^*$ calculated in the process of S28. When NO in the process of S30, the PU 52 may perform the processes of S36 to S46 using, for example, the target steered angle $\alpha1^*$ calculated by the process of S32 and a value whose absolute value is smaller than the target steered angle $\alpha1^*$ by a predetermined amount.

A process of providing the target trajectory Trt with a margin may be a process of calculating the boundaries TrtL, TrtR as follows. In other words, this process may be a process of calculating the boundaries TrtL, TrtR by the process of S22 using "$\alpha2^*+\delta$" and "$\alpha2^*-\delta$" that are determined by the target virtual steering angle $\alpha2^*$ acquired in the process of S20.

In the case where the process of providing the predicted trajectory Trp with a margin is performed, the process of providing the target trajectory Trt with a margin need not necessarily be performed. For example, a single target trajectory may be displayed as the target trajectory Trt. In the case where the process of providing the predicted trajectory Trp with a margin is performed, the PU 52 need not display any visual information on the target trajectory Trt.

For example, as described in the section "Steering Process," in the case where steering is automatically controlled while the combination vehicle 10 is traveling forward, the PU 52 may superimpose the predicted trajectory Trp of the tractor 20 on an image of the area in front of the tractor 20.

Figure 13A:
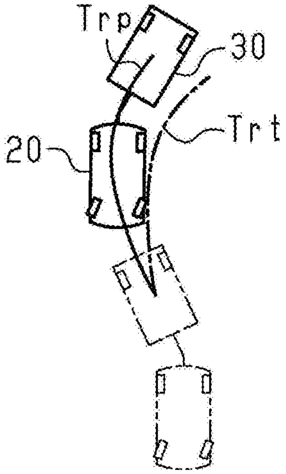
FIGS. 13A and 13B are diagrams showing a display example according to a modification of the embodiment.
Figure 13B:
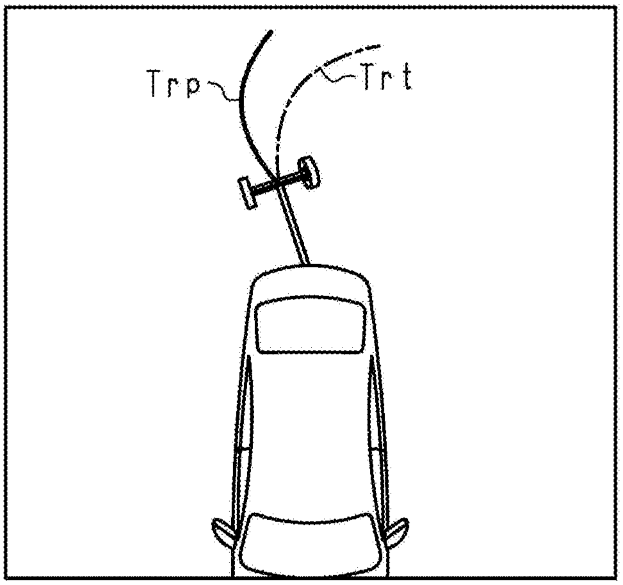

The process of displaying the predicted trajectory Trp is not limited to the process in which the predicted trajectory Trp is superimposed on an image of the surroundings of the combination vehicle 10 captured by a camera. For example, a bird's-eye view may be used as illustrated in FIGS. 13A and 13B. This allows the behavior of the trailer 30 to be looked from a higher perspective. FIGS. 13A and 13B correspond to FIGS. 8A and 8B. This is particularly effective in the reverse assist process for the combination vehicle 10 having a predetermined trailer 30 such as a camper. That is, when the trailer 30 is high as shown by a long dashed short dashed line in FIG. 1, the backup camera 76 is not able to capture an image including the rear of the trailer 30.

The predicted trajectory information that is superimposed on the bird's-eye view is not limited to the predicted trajectory Trp. For example, as described above, the region obtained by providing the predicted trajectory Trp with a margin may be displayed superimposed on the bird's-eye view.

Figure 14A:
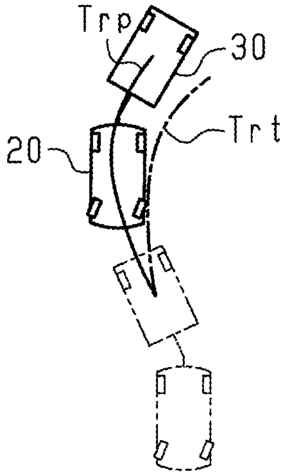
FIGS. 14A and 14B are diagrams showing a display example according to a modification of the embodiment.
Figure 14B:
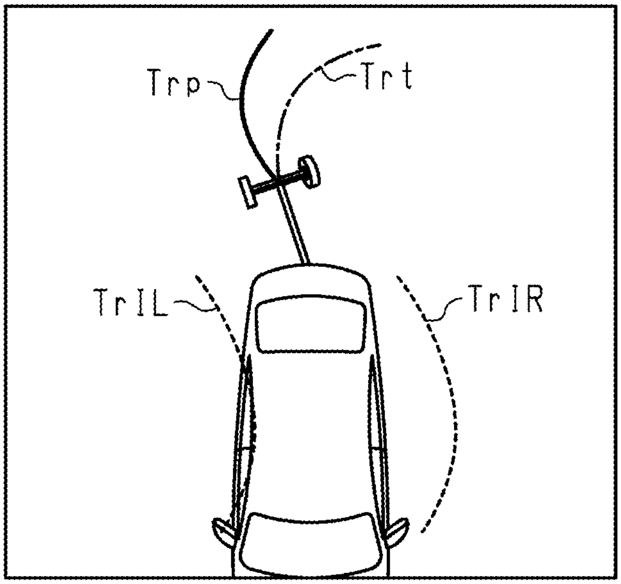

The predicted trajectory information of the tractor 20 may also be displayed together with the predicted trajectory information of the trailer 30. In FIGS. 14A and 14B, the predicted trajectory Trp and the target trajectory Trt are superimposed on the bird's-eye view, and a predicted trajectory Tr1L of the left end of the tractor 20 and a predicted trajectory Tr1R of the right end of the tractor 20 are also displayed. FIGS. 14A and 14B correspond to FIGS. 8A and 8B. The method for displaying the predicted trajectory of the tractor 20 is not limited to the method in which the predicted trajectory Tr1L of the left end and the predicted trajectory Tr1R of the right end are displayed. For example, a method may be used in which a single predicted trajectory, such as a predicted trajectory of the center of gravity of the tractor 20, is displayed. A region with a margin may be displayed by, for example, marking the region between the predicted trajectory Tr1L of the left end and the predicted trajectory Tr1R of the right end.

The method in which the predicted trajectory information of the tractor 20 is displayed together with the predicted trajectory information of the trailer 30 need not necessarily use a bird's-eye view. For example, the PU 52 may superimpose the predicted trajectory information of the trailer 30 and the predicted trajectory information of the tractor 20 on a captured image of the outside of the combination vehicle 10. In such a process, the target trajectory information of the trailer 30 need not necessarily be displayed.

The predicted trajectory information of the trailer 30 to be displayed need not necessarily be the region of the predicted trajectory Trp with a margin or the region of the predicted trajectory Trp with a margin. For example, when the direction of travel of the trailer 30 is not straight during manual steering of the combination vehicle 10, a right or left arrow indicating the direction of travel of the trailer 30 may be displayed.

"Control Device"

The control device is not limited to the one that includes the PU 52 and the storage device 54 and that performs software processing. For example, the control device may include a dedicated hardware circuit, such as an ASIC, that performs, by hardware processing, at least part of the various processes performed in the above embodiment. That is, the control device can be any control device as long as it has one of the following configurations (a) to (c): (a) a processing circuit including a processing device that performs all of the above processes according to a program, and a program storage device such as a storage device that stores the program, (b) a processing circuit including a processing device that performs part of the above processes according to a program, a program storage device, and a dedicated hardware circuit that performs the remainder of the above processes, and (c) a processing circuit including a dedicated hardware circuit that performs all of the above processes. There may be a plurality of software execution devices including a processing device and a program storage device, and a plurality of dedicated hardware circuits.

"Computer"

The computer that executes a control program such as the reverse assist program 54*a* is not limited to the computer installed in the combination vehicle 10. For example, the computer may be configured by both the PU 52 installed in the combination vehicle 10 and a mobile terminal of the driver. In this case, for example, the mobile terminal may perform the processes of S28 to S32 and S36 to S50.

"Vehicle"

The combination vehicle is not limited to the vehicle illustrated in FIG. 1.

The invention claimed is:

1. A control device for a combination vehicle including a tractor, a trailer that is towed by the tractor, and an interface for a driver to specify a target virtual steering angle that is a target value of a virtual steering angle, the virtual steering angle being a variable indicating a direction of travel at a connection point between the tractor and the trailer, the control device being configured to perform a state quantity acquisition process, a predicted trajectory information calculation process, a target virtual steering angle acquisition process, a display process, and a steering process, wherein:

the state quantity acquisition process is a process of acquiring a state quantity of the combination vehicle;

the predicted trajectory information calculation process is a process of calculating predicted trajectory information of the trailer according to the state quantity;

the target virtual steering angle acquisition process is a process of acquiring the target virtual steering angle according to an input operation that is performed on the interface by the driver;

the predicted trajectory information calculation process is a process of, by using the virtual steering angle as an input, calculating a predicted trajectory of the trailer in a case of controlling an actual virtual steering angle to as close as possible to the target virtual steering angle within a range in which a magnitude of a steered angle of the tractor is equal to or less than an upper limit value;

the display process is a process of displaying the predicted trajectory information by operating a display device; and the steering process is a process of controlling the steered angle of the tractor so as to control the virtual steering angle toward the target virtual steering angle.

2. The control device for the combination vehicle according to claim 1, wherein:

the control device is configured to perform a target trajectory calculation process;

the target trajectory calculation process is a process of calculating a target trajectory that is a trajectory of the trailer when the target virtual steering angle is used as an input and the virtual steering angle is set to the target virtual steering angle; and the display process includes a process of displaying the target trajectory in addition to the predicted trajectory.

3. The control device for the combination vehicle according to claim 1, wherein:

the state quantity acquisition process includes a process of acquiring a hitch angle;

the hitch angle is an angle between a front-rear direction of the tractor and a front-rear direction of the trailer;

the predicted trajectory information calculation process includes a target steered angle calculation process, an upper limit guard process, and a displacement prediction process;

the target steered angle calculation process includes a process of calculating a target steered angle that is a target value of the steered angle of the tractor, by using the target virtual steering angle and the hitch angle as inputs;

the upper limit guard process is a process of setting a magnitude of the target steered angle to the upper limit value when the magnitude of the target steered angle is larger than the upper limit value;

the displacement prediction process includes a process of predicting a displacement of the trailer using the target steered angle subjected to the upper limit guard process as an input; and the steering process includes a process of controlling the virtual steering angle toward the target virtual steering angle by controlling the steered angle toward the target steered angle.

4. The control device for the combination vehicle according to claim 3, wherein:

the control device is configured to perform a hitch angle prediction process;

the hitch angle prediction process is a process of predicting a future value of the hitch angle using the target steered angle subjected to the upper limit guard process as an input; and the control device is configured to perform the following three processes a plurality of times: the target steered angle calculation process that uses the predicted hitch angle as an input; the hitch angle prediction process that uses the target steered angle subjected to the upper limit guard process as an input; and the displacement prediction process that uses the predicted hitch angle and the target steered angle subjected to the upper limit guard process as inputs.

5. The control device for the combination vehicle according to claim 1, wherein:

the control device is configured to perform a determination process;

the determination process is a process of determining whether a reverse assist mode is selected;

the reverse assist mode is a process of implementing a process of reversing the combination vehicle by the steering process; and the display process is configured to be performed in the reverse assist mode.

6. The control device for the combination vehicle according to claim 5, wherein the display process is configured to be continued even when the combination vehicle switches from reversing to traveling forward in the reverse assist mode.

7. The control device for the combination vehicle according to claim 6, wherein:

the control device is configured to perform a cancellation process; and the cancellation process is a process of canceling the reverse assist mode when a forward traveling speed of the combination vehicle becomes equal to or higher than a threshold.

8. The control device for the combination vehicle according to claim 1, wherein the display process includes a process of superimposing the predicted trajectory information on an image of an outside of the combination vehicle captured by a camera.

9. The control device for the combination vehicle according to claim 1, wherein the display process includes a process of superimposing the predicted trajectory information on a bird's-eye view of an area around the combination vehicle.

10. A control method for a combination vehicle including a tractor, a trailer that is towed by the tractor, and an interface for a driver to specify a target virtual steering angle that is a target value of a virtual steering angle, the virtual steering angle being a variable indicating a direction of travel at a connection point between the tractor and the trailer, the control method comprising performing a state quantity acquisition process, a predicted trajectory information calculation process, a target virtual steering angle acquisition process, a display process, and a steering process, wherein:

the state quantity acquisition process is a process of acquiring a state quantity of the combination vehicle;

the predicted trajectory information calculation process is a process of calculating predicted trajectory information of the trailer according to the state quantity;

the target virtual steering angle acquisition process is a process of acquiring the target virtual steering angle according to an input operation that is performed on the interface by the driver;

the predicted trajectory information calculation process is a process of, by using the virtual steering angle as an input, calculating a predicted trajectory of the trailer in a case of controlling an actual virtual steering angle to as close as possible to the target virtual steering angle within a range in which a magnitude of a steered angle of the tractor is equal to or less than an upper limit value;

the display process is a process of displaying the predicted trajectory information by operating a display device; and the steering process is a process of controlling the steered angle of the tractor so as to control the virtual steering angle toward the target virtual steering angle.

11. A non-transitory computer-readable medium storing a control program for a combination vehicle including a tractor, a trailer that is towed by the tractor, and an interface for a driver to specify a target virtual steering angle that is a target value of a virtual steering angle, the virtual steering angle being a variable indicating a direction of travel at a connection point between the tractor and the trailer, the control program being a program that causes a computer to perform a state quantity acquisition process, a predicted trajectory information calculation process, a target virtual steering angle acquisition process, a display process, and a steering process, wherein:

the state quantity acquisition process is a process of acquiring a state quantity of the combination vehicle;

the predicted trajectory information calculation process is a process of calculating predicted trajectory information of the trailer according to the state quantity;

the target virtual steering angle acquisition process is a process of acquiring the target virtual steering angle according to an input operation that is performed on the interface by the driver;

the predicted trajectory information calculation process is a process of, by using the virtual steering angle as an input, calculating a predicted trajectory of the trailer in a case of controlling an actual virtual steering angle to as close as possible to the target virtual steering angle within a range in which a magnitude of a steered angle of the tractor is equal to or less than an upper limit value;

the display process is a process of displaying the predicted trajectory information by operating a display device; and the steering process is a process of controlling the steered angle of the tractor so as to control the virtual steering angle toward the target virtual steering angle.

12. The control device for the combination vehicle according to claim 1, wherein the state quantity acquisition process includes a process of acquiring a hitch angle, wherein the hitch angle is an angle between a front-rear direction of the tractor and a front-rear direction of the trailer, wherein the virtual steering angle is an angle between a direction of movement of the connection point and a front-rear direction of the trailer, and wherein the predicted trajectory information calculation process includes a process of calculating a target steered angle that is a target value of the steered angle of the tractor by using the target virtual steering angle and the acquired hitch angle as inputs.

13. The control method for the combination vehicle according to claim 10, wherein the state quantity acquisition process includes a process of acquiring a hitch angle, wherein the hitch angle is an angle between a front-rear direction of the tractor and a front-rear direction of the trailer, wherein the virtual steering angle is an angle between a direction of movement of the connection point and a front-rear direction of the trailer, and wherein the predicted trajectory information calculation process includes a process of calculating a target steered angle that is a target value of the steered angle of the tractor by using the target virtual steering angle and the acquired hitch angle as inputs.

14. The non-transitory computer-readable medium according to claim 11, wherein the state quantity acquisition process includes a process of acquiring a hitch angle, wherein the hitch angle is an angle between a front-rear direction of the tractor and a front-rear direction of the trailer, wherein the virtual steering angle is an angle between a direction of movement of the connection point and a front-rear direction of the trailer, and wherein the predicted trajectory information calculation process includes a process of calculating a target steered angle that is a target value of the steered angle of the tractor by using the target virtual steering angle and the acquired hitch angle as inputs.

* * * * *